US008839002B2

(12) United States Patent
Chang

(10) Patent No.: US 8,839,002 B2
(45) Date of Patent: Sep. 16, 2014

(54) OPTICAL MEDIA RECORDING DEVICE FOR PROTECTING DEVICE KEYS AND RELATED METHOD

(75) Inventor: Chun-Wei Chang, Hsinchu (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 1079 days.

(21) Appl. No.: 12/107,773

(22) Filed: Apr. 23, 2008

(65) Prior Publication Data

US 2009/0268907 A1 Oct. 29, 2009

(51) Int. Cl.
*G06F 12/14* (2006.01)
*G06F 21/72* (2013.01)
*H04L 9/00* (2006.01)

(52) U.S. Cl.
CPC .............. *G06F 12/14* (2013.01); *G06F 21/72* (2013.01); *H04L 9/00* (2013.01)
USPC ....................................................... 713/193

(58) Field of Classification Search
CPC ................................. G06F 12/14; H04L 9/00
USPC ....................................................... 713/193
See application file for complete search history.

(56) References Cited

U.S. PATENT DOCUMENTS

| 6,789,192 | B2 * | 9/2004 | Hirota et al. ................ 713/172 |
| 6,993,135 | B2 * | 1/2006 | Ishibashi ....................... 380/277 |
| 7,685,636 | B2 * | 3/2010 | Leake et al. ..................... 726/20 |
| 7,739,507 | B2 * | 6/2010 | Eckleder et al. .............. 713/172 |
| 7,789,314 | B2 * | 9/2010 | Karstens ........................ 235/492 |
| 7,840,818 | B2 * | 11/2010 | Sabet-Sharghi et al. ...... 713/193 |
| 7,895,661 | B2 * | 2/2011 | Dowdy et al. .................. 726/27 |
| 8,023,653 | B2 * | 9/2011 | Doherty et al. ............... 380/201 |
| 8,099,519 | B2 * | 1/2012 | Ueda et al. ..................... 709/246 |
| 8,121,952 | B2 * | 2/2012 | Collar et al. ..................... 705/51 |

(Continued)

FOREIGN PATENT DOCUMENTS

JP 2004295388 A * 10/2004

OTHER PUBLICATIONS

Rawlings, "Raising the Bar for Hardware Security: Physical Layer Security in Standard CMOS", Mar. 2008.*

(Continued)

*Primary Examiner* — Krista M. Zele
*Assistant Examiner* — Ondrej Vostal
(74) *Attorney, Agent, or Firm* — Winston Hsu; Scott Margo

(57) ABSTRACT

To protect device keys, an optical media recording device capable of performing AACS encryption on data does not have any device keys, and the optical media recording device performs AACS encryption by activating recording software stored in a memory the optical media recording device, and utilizing a pre-calculated media key stored in the memory of the optical media recording device to perform AACS encryption on the data.

17 Claims, 4 Drawing Sheets

(56) References Cited

U.S. PATENT DOCUMENTS

| | | | |
|---|---|---|---|
| 8,205,083 B2* | 6/2012 | Suu et al. | 713/169 |
| 2002/0085715 A1* | 7/2002 | Ripley | 380/202 |
| 2004/0249805 A1* | 12/2004 | Chuvilskiy | 707/3 |
| 2005/0154682 A1* | 7/2005 | Taylor | 705/71 |
| 2005/0273632 A1* | 12/2005 | Kawakami | 713/193 |
| 2006/0014523 A1* | 1/2006 | Reilly | 455/412.1 |
| 2006/0015580 A1* | 1/2006 | Gabriel et al. | 709/219 |
| 2006/0015945 A1* | 1/2006 | Fields | 726/27 |
| 2006/0092049 A1* | 5/2006 | Dellow | 341/50 |
| 2006/0236318 A1* | 10/2006 | Moran et al. | 717/168 |
| 2007/0092081 A1* | 4/2007 | Yokota et al. | 380/277 |
| 2007/0183598 A1* | 8/2007 | Kim et al. | 380/277 |
| 2007/0192798 A1* | 8/2007 | Morgan | 725/51 |
| 2007/0211901 A1* | 9/2007 | Isozaki et al. | 380/237 |
| 2007/0255965 A1* | 11/2007 | McGucken | 713/193 |
| 2007/0288766 A1* | 12/2007 | Kamio et al. | 713/193 |
| 2007/0297761 A1* | 12/2007 | Shibutani | 386/95 |
| 2008/0069353 A1* | 3/2008 | Lotspiech | 380/201 |
| 2008/0069354 A1* | 3/2008 | Kitani et al. | 380/202 |
| 2008/0072072 A1* | 3/2008 | Muraki et al. | 713/193 |
| 2008/0114992 A1* | 5/2008 | Robert et al. | 713/193 |
| 2008/0199007 A1* | 8/2008 | Candelore | 380/201 |
| 2008/0226078 A1* | 9/2008 | Gabryjelski et al. | 380/277 |
| 2008/0253563 A1* | 10/2008 | Chang | 380/200 |
| 2008/0267396 A1* | 10/2008 | Shin et al. | 380/45 |
| 2008/0301465 A1* | 12/2008 | Gandhi et al. | 713/189 |
| 2009/0013172 A1* | 1/2009 | Ju et al. | 713/150 |
| 2009/0028342 A1* | 1/2009 | Cerruti et al. | 380/279 |
| 2009/0037733 A1* | 2/2009 | Lelievre et al. | 713/168 |
| 2009/0041248 A1* | 2/2009 | Hatae et al. | 380/277 |
| 2009/0092249 A1* | 4/2009 | Doherty et al. | 380/201 |
| 2009/0113556 A1* | 4/2009 | Mantin et al. | 726/26 |
| 2009/0169019 A1* | 7/2009 | Bauchot et al. | 380/278 |
| 2009/0199287 A1* | 8/2009 | Vantalon et al. | 726/9 |
| 2009/0199303 A1* | 8/2009 | Ahn et al. | 726/27 |
| 2009/0217057 A1* | 8/2009 | Konetski | 713/193 |
| 2009/0282432 A1* | 11/2009 | Hahnefeld et al. | 725/31 |
| 2010/0020968 A1* | 1/2010 | Jin et al. | 380/200 |
| 2010/0023760 A1* | 1/2010 | Lee et al. | 713/158 |
| 2010/0040231 A1* | 2/2010 | Jin et al. | 380/255 |
| 2010/0100969 A1* | 4/2010 | Yamaguchi et al. | 726/30 |
| 2010/0153724 A1* | 6/2010 | Staring | 713/169 |

OTHER PUBLICATIONS

Jin, "Privacy, Traceability, and Anonymity for Content Protection", 2006.*
Intel Corporation, "Advanced Access Content System (AACS) Blu-ray Disc Recordable Book", 2006.*
Intel Corporation, "Advanced Access Content System (AACS) Blu-ray Disc Recordable Book", 2008 (copyright 2005-2010).*
Intel Corporation, "Advanced Access Content System (AACS) Blu-ray Disc Recordable Book", 2010 (Copyright 2005-2010).*
Intel Corporation, "Advanced Access Content System (AACS) Introduction and Common Cryptographic Elements", 2006.*
Intel Corporation, "Advanced Access Content System (AACS) HD DVD Recordable Book", 2006.*
Ponceleon et al., "Multimedia Content Protection", 2006.*
Ponceleon et al., "Enabling Secure Distribution of Digital Media to SD-Cards", 2006.*
Sun et al., "AACS-compatible multimedia joint encryption and fingerprinting: Security issues and some solutions", 2007.*
Intel Corporation, "Advanced Access Content System (AACS): Introduction and Common Cryptographic Elements", Intel, Feb. 2006.*
Wikipedia, "Advanced Access Control System".*
Henry et al., "An Overview of the Adanced Access Content System (AACS)", 2007.*
Fretland et al., "State of the art in Digital Rights Management: A Mariage project report", Jun. 2008.*
ISO/IEC, "Advanced Audio Coding (AAC)", 2006.*
Jin et al., "Practical Forensic Analysis in Advanced Access Content System", 2006.*
Jin et al., "Efficient Coalition Detection in Traitor Tracing", 2008.*
Jin et al., "Hyrid Traitor Tracing", 2006.*
Intel Corporation, "Advanced Access Content System (AACS)", Aug. 2006.*
Persson et al., "Cryptography and DRM", 2008.*
Bradbury, "Decoding digital rights management", 2006.*

* cited by examiner

OPTICAL MEDIA RECORDING DEVICE FOR PROTECTING DEVICE KEYS AND RELATED METHOD

BACKGROUND OF THE INVENTION

1. Field of the Invention

The present invention relates to optical media recording devices, and more particularly, to an optical media recording device capable of performing AACS encryption and related method for protecting device keys of the optical media recording device.

2. Description of the Prior Art

In the past, a variety of recordable media have been developed for use in recording and distributing commercial films, as well as home videos. Examples of such include video CDs (VCDs), VHS tapes, LaserDiscs, DVDs, and Blu-ray Discs (BDs). With the exception of VHS tapes and LaserDiscs, which may be considered analog media, modern media, such as DVDs and BDs, may be considered digital media. In other words, digitally encoded video data may be recorded to DVDs and BDs using an optical media recording device, and then read out, decoded, and played back using an optical media playback device.

One advantage of digital encoding over analog encoding is ability to encrypt the digitally encoded video data, which may prevent unauthorized copying and distribution of copyrighted media. A Content Scramble System (CSS) is employed as a Digital Rights Management (DRM) scheme for protecting commercially produced DVDs. CSS key sets are licensed for use in DVD burners and DVD players, and manufacturers desiring to make compliant devices are expected to follow all requirements of the CSS system. For example, all compliant disks incorporate keys written into a lead-in portion of the DVD, so a compliant DVD player must be able to read the keys in the lead-in portion to be able to play the rest of the DVD properly. However, as CSS employed a relatively weak encryption algorithm, with key lengths of around 25 bits, a brute-force algorithm was later developed which could crack the keys in the lead-in portion in under a minute. Thus, the CSS encryption system is easily compromised.

As new high-definition (HD) media types, such as the BD mentioned above, are developed, new encryption schemes are also employed. Blu-ray discs utilize an Advanced Access Content System (AACS) licensed by an AACS Licensing Administrator (AACS LA), a consortium including Disney, Microsoft, Matsushita, Sony, and others. The AACS encryption scheme uses Advanced Encryption Standard (AES) encryption and decryption. In AACS title keys utilized for encrypting and decrypting content on the BD are derived from a media key and a random number written on the BD. More particularly, the random number and the media key are used to encrypt/decrypt the title key for authority management. Device keys, assigned to each individual device compliant with the AACS encryption scheme, is utilized for determining the media key from a media key block (MKB) based on a subset difference tree scheme. As the device keys may be unique to each player or recorder, if the device keys are compromised, the AACS LA may update the MKB to revoke the player or recorder. Thus, all releases made after revocation of the player or recorder will become unusable by the player or recorder.

The AACS encryption scheme first appeared in Blu-ray devices in 2006, and since then, some decryption keys have already been determined from software BD players with weak protection and released on the Internet. Typically, a hacker will attempt to gain access to the device keys mentioned above by analyzing memory for presence of the device keys. If the device keys are obtained, and the player, whether software or hardware, is revoked, this may cause inconvenience to the software vendor or hardware manufacturer as they must update the device keys issued with their product each time the device keys are compromised. Likewise, if the player software uses the same device keys for each install, all users of the software must update their software version to be able to play the latest releases. Further, for the player software and recorder software, they would be installed in the same device as the player and a recorder. This further increases the risk of the device keys being exposed.

SUMMARY OF THE INVENTION

According to the present invention, a method of performing AACS encryption in an optical media recording device comprises activating recording software having no device keys stored in the optical media recording device, and the recording software utilizing a pre-calculated media key stored in a memory of the optical media recording device to perform AACS encryption of data.

According to the present invention, a method for recording encrypted content in an optical storage medium comprises receiving content, receiving a pre-calculated media key, encrypting the content using a title key, encrypting the title key using the pre-calculated media key, and recording the encrypted content and the encrypted title key into the optical storage medium.

According to the present invention, an optical media recording device having no device keys for performing AACS encryption of data comprises a memory including a media key storage region storing a pre-calculated media key, and an AACS encryption program code region storing program code for performing AACS encryption based on the pre-calculated media key. The optical media recording device further comprises a processor for executing the program code to generate AACS-encrypted data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
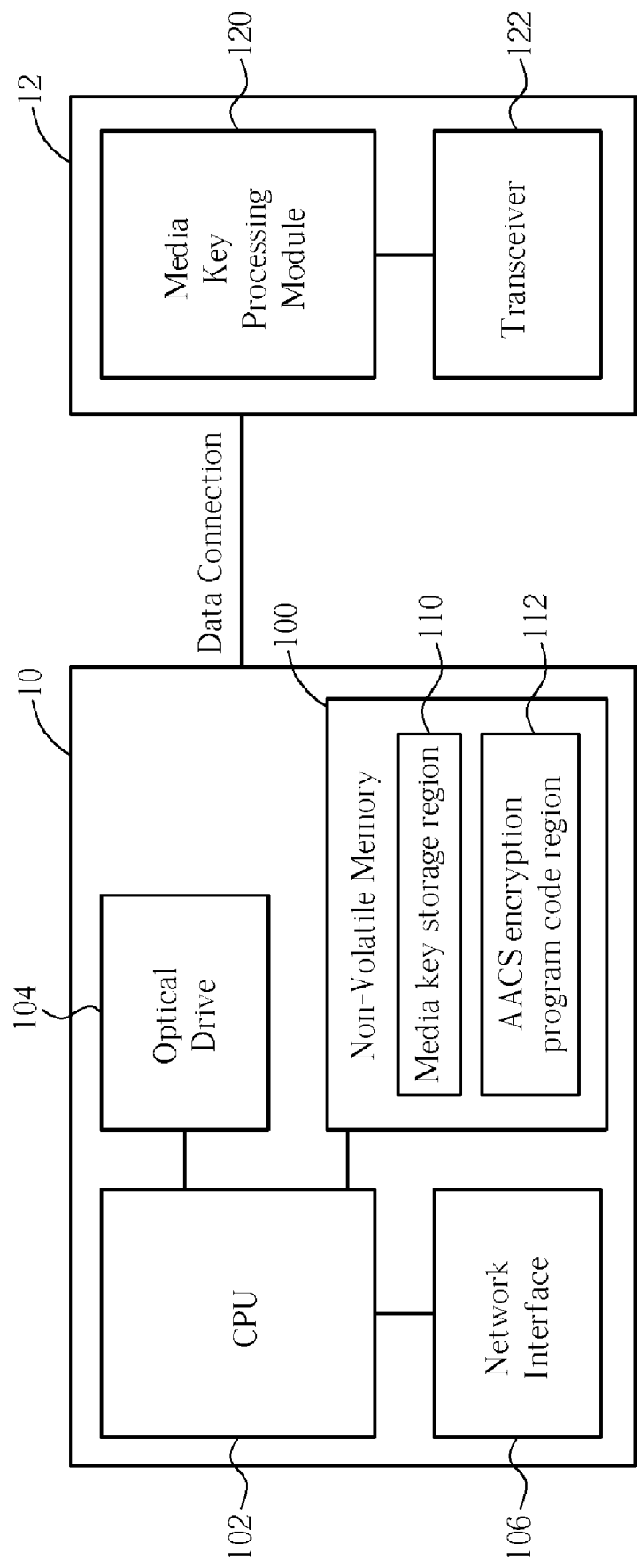
FIG. 1 is a diagram of an optical media recording system according to the present invention.

Please refer to FIG. 1, which is a diagram of an optical media recording system including an optical media recording device 10 and a server 12 according to the present invention. The optical media recording device 10 may be a standalone recorder or a computing device, such as a personal computer. The optical media recording device 10 comprises a non-volatile memory 100, a processor 102 coupled to the memory 100, an optical drive 104 coupled to the processor 102, and a network interface 106 coupled to the processor 102. The non-volatile memory 100 includes a media key storage region 110 storing a pre-calculated media key, and an AACS encryption program code region 112 storing program code for performing AACS encryption based on the pre-calculated media key. The processor 102 may be utilized for executing the program code stored in the AACS encryption program code region 112 to generate AACS-encrypted data. The optical drive 104 may be a Blu-ray Disc (BD) drive, an HD-DVD drive, or another drive compliant with the AACS licensing agreement. The network interface 106 may be a wired interface or a wireless interface, and may be utilized for establishing a data connection with the server 12. The server 12 may comprise a media key processing module 120 for generating the pre-calculated media key, and a transceiver 122 coupled to the media key processing module 120 for establishing the data connection with the optical media recording device 10 and sending the pre-calculated media key to the optical media recording device 10. In the present invention, the optical media recording device 10 may not comprise any device keys related to, or used in, performing AACS encryption. In other words, the optical media recording device 10 may comprise the pre-calculated media key, or pre-calculated media keys, without need for calculation of any media keys on the fly based on the device keys.

If the optical media recording device 10 is a personal computer, a burning software, or recording software, may be installed in the non-volatile memory 100 of the optical media recording device 10. The burning software may provide a graphical user interface (GUI) that may be displayed in an operating system (OS) GUI of an OS stored in the non-volatile memory 100 of the optical media recording device 10. The OS may comprise drivers stored in the non-volatile memory 100 for controlling the optical drive 104 to record data to an optical disc, which may be a blank optical disc or a pre-formatted optical disc. The burning software may access the drivers to control the optical drive 104. Before recording the data to the optical disc, the burning software may encrypt the data using an AACS encryption method, such as an AES encryption scheme.

Figure 2:
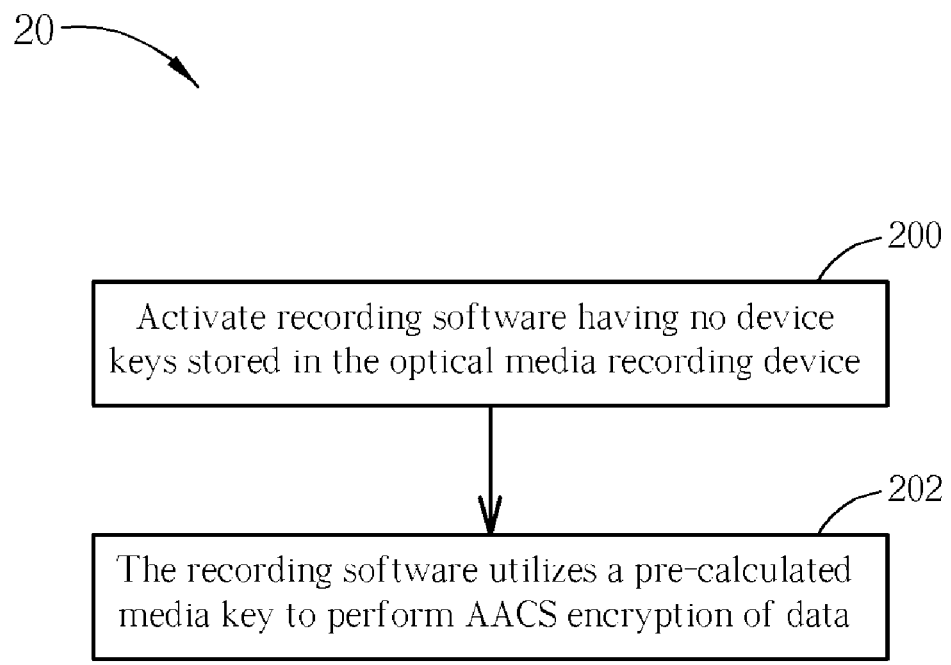
FIG. 2 is a flowchart of a process for performing AACS encryption according to the present invention.

Please refer to FIG. 2, which is a flowchart of a process 20 for performing AACS encryption on the data according to the present invention. The process 20 may be compiled into the burning software, or may be compiled into an executable accessible by the burning software. The process 20 begins with activating the recording software having no device keys stored in the optical media recording device 10 (Step 200). The recording software may be activated through input from an input device, e.g. a mouse click or a key strike, directing the processor 102 to execute an executable of the recording software. Then, the recording software may utilize the pre-calculated media key stored in the non-volatile memory 100 of the optical media recording device 10 to perform AACS encryption of the data (Step 202). The pre-calculated media key stored in the non-volatile memory 100 of the optical media recording device 10 may be stored as a registry entry of a registry of the OS. In other words, the media key storage region of the non-volatile memory may be located in a registry storage region of the non-volatile memory, in which the registry of the OS is stored. The data that may be encrypted and recorded to the optical disc, such as the BD mentioned above, may be audiovisual data, such as a commercial film production. The data may optionally be encrypted and recorded to an ISO file and stored in the non-volatile memory 100.

Figure 3:
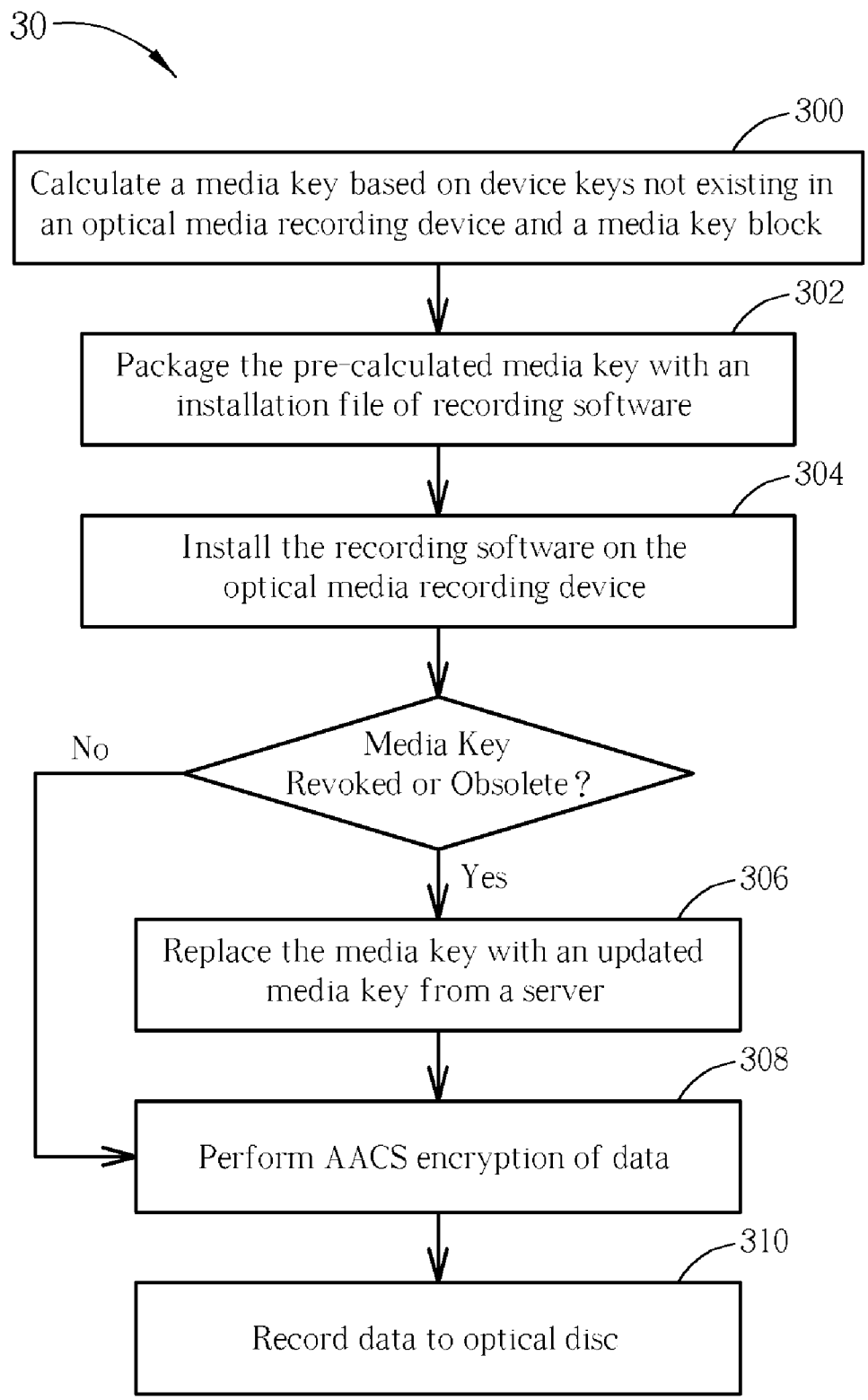
FIG. 3 is a flowchart of a process of use of recording software according to the present invention.

Please refer to FIG. 3, which is a flowchart of a process 30 for use of the recording software according to the present invention. The process 30 starts with a computing device calculating the pre-calculated media key based on the device keys not existing in the optical media recording device 10 and a media key block (Step 300). The pre-calculated media key may then be packaged with an installation file of the recording software (Step 302). The installation file may then be utilized to install the recording software on the optical media recording device 10 (Step 304). As mentioned above, at this point, the pre-calculated media key may be stored in the non-volatile memory, either in a file, or as a registry entry. If, at some point, an update is needed for the pre-calculated media key, e.g. if the pre-calculated media key is revoked or becomes obsolete, the pre-calculated media key may be updated, or replaced, with an updated pre-calculated media key from the server (Step 306). The server may calculate the updated pre-calculated media key, and send the updated pre-calculated media key to the optical media recording device through the data connection. The optical media recording device stores the updated pre-calculated media key in a corresponding memory space of the recording software. More particularly, the updated pre-calculated media key may be stored in a storage device, such as a hard disk drive, or a non-volatile memory, for example. Then, the recording software may utilize the pre-calculated media key, or the updated pre-calculated media key, to perform AACS encryption of the data (Step 308), and the data may be recorded to the BD (Step 310).

Figure 4:
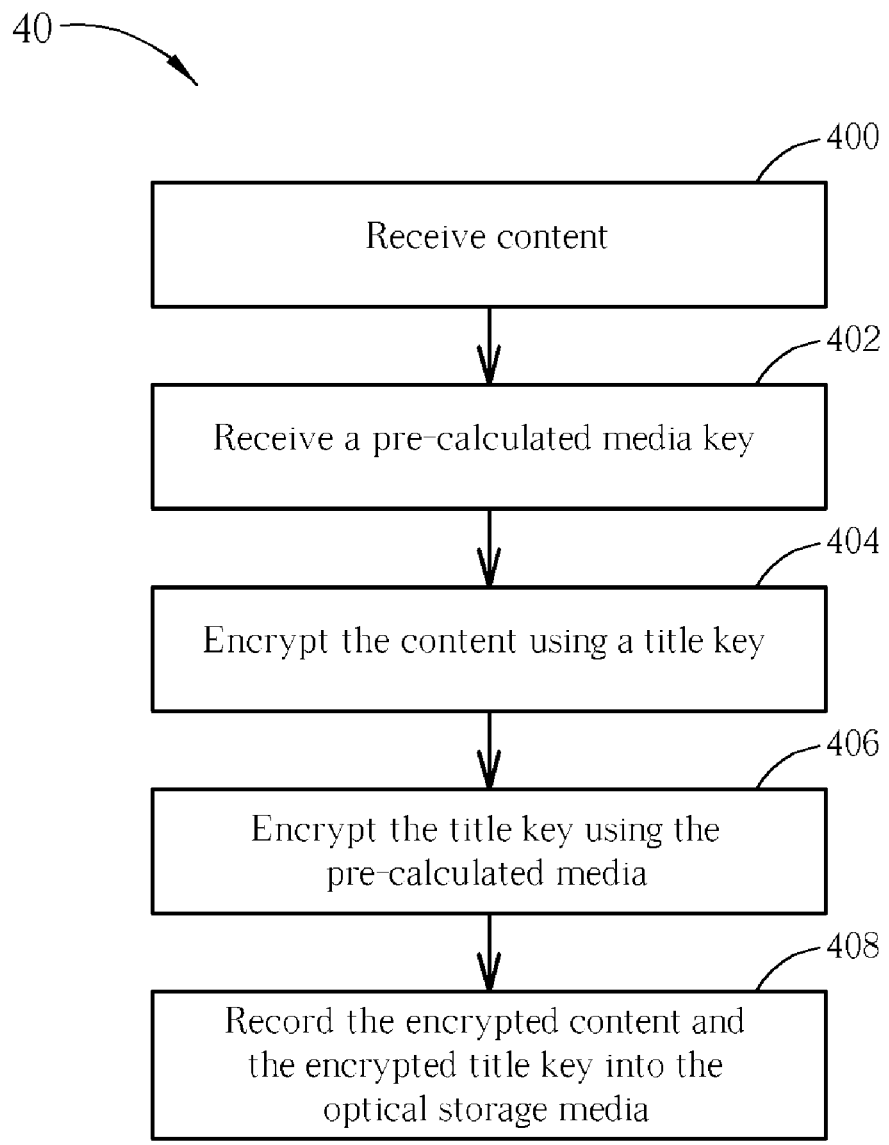
FIG. 4 is a flowchart of a process for encrypting and recording content according to the present invention.

Please refer to FIG. 4, which is a flowchart of a process 40 for encrypting and recording content according to the present invention. The process 40 starts with receiving the content to be recorded (Step 400), e.g. audio, video, or audiovisual content. Then, a pre-calculated media key is received (Step 402). A title key is utilized for encrypting the content (Step 404). The title key is then encrypted using the pre-calculated media key (Step 406), and the encrypted content and the encrypted title key are recorded into the optical storage media (Step 406). The pre-calculated media key may be received from a storage device, such as a non-volatile memory, where the pre-calculated media key has been stored, or from a server via networking. The server may calculate the pre-calculated media key based on a device key of the server and a media key block. And, the pre-calculated media key may be packaged with an installation file of a recording software.

By only storing the pre-calculated media key in the optical media recording device 10, the present invention prevents discovery and distribution of the device keys licensed to the software company responsible for developing the recording software. Thus, revocation of the device keys licensed to the software company and end users of the recording software may also be prevented. New media keys may be obtained from the server run by the software company, such that the device keys may be omitted from the recording software without hindering usage of the recording software by the end user. The present invention thus increases security by reducing the risk of exposure of the device keys in the player/recorder, while maintaining high quality of service to the end user.

Those skilled in the art will readily observe that numerous modifications and alterations of the device and method may be made while retaining the teachings of the invention.

What is claimed is:

1. A method of performing AACS encryption in an optical media recording device, the method comprising:
activating recording software having no AACS device keys stored in the optical media recording device, the recording software being used by an end user, the AACS device keys being omitted from the recording software without hindering usage of the recording software by the end user, and preventing revocation of the AACS device keys provided by an AACS licensing administrator; and the recording software utilizing a pre-calculated media key stored in a memory of the optical media recording device to perform AACS encryption of data, wherein the pre-calculated media key is calculated based on the AACS device keys and a media key block by a server, and the AACS device keys are provided by an AACS licensing administrator (AACS LA) to the server;

wherein the pre-calculated media key is packaged in an installation file of the recording software.

2. The method of claim 1, further comprising utilizing the installation file to install the recording software on the optical media recording device.

3. The method of claim 1, further comprising updating the pre-calculated media key with an updated pre-calculated media key from a server when an update is needed.

4. The method of claim 3 wherein the server calculates the updated pre-calculated media key, and sends the updated pre-calculated media key to the optical media recording device through networking.

5. The method of claim 1, wherein the recording software utilizing the pre-calculated media key stored in the memory of the optical media recording device to perform AACS encryption of the data is the recording software utilizing the pre-calculated media key stored in a non-volatile memory of the optical media recording device to perform AACS encryption of the data.

6. The method of claim 1, wherein activating the recording software having no AACS device keys stored in the optical media recording device is activating the recording software having no AACS device keys stored in a personal computer.

7. The method of claim 1, wherein the recording software utilizing the pre-calculated media key stored in the memory of the optical media recording device to perform AACS encryption of the data is the recording software utilizing the pre-calculated media key stored in the memory of the optical media recording device to perform AACS encryption of audiovisual data.

8. The method of claim 1 further comprising the optical media recording device recording the data to a Blu-ray Disc after performing AACS encryption of the data.

9. A method for recording encrypted content in an optical storage medium, the method comprising:

activating recording software having no AACS device keys stored in an optical media recording device, the recording software being used by an end user, the AACS device keys being omitted from the recording software without hindering usage of the recording software by the end user, and preventing revocation of the AACS device keys provided by an AACS licensing administrator;

receiving content;

receiving a pre-calculated media key calculated based on the AACS device keys and a media key block by a server, and the AACS device keys are provided by an AACS licensing administrator (AACS LA) to the server, wherein the pre-calculated media key is packaged in an installation file of the recording software;

encrypting the content using a title key;

encrypting the title key using the pre-calculated media key; and recording the encrypted content and the encrypted title key into the optical storage medium.

10. The method of claim 9, wherein the pre-calculated media key is received from a storage device.

11. The method of claim 9, wherein the pre-calculated media key is received from the server via networking.

12. The method of claim 11 further comprising:

storing the pre-calculated media key in a storage device.

13. An optical media recording device having no AACS device keys for performing AACS encryption of data, the optical media recording device being used by an end user, the AACS device keys being omitted from the optical media recording device without hindering usage of the optical media recording device by the end user, and preventing revocation of the AACS device keys provided by an AACS licensing administrator, the optical media recording device comprising:

a non-volatile memory including a media key storage region storing a pre-calculated media key, and an AACS encryption program code region storing program code for performing AACS encryption based on the pre-calculated media key, wherein the pre-calculated media key is calculated based on the AACS device keys and a media key block by a server, and the AACS device keys are provided by an AACS licensing administrator (AACS LA) to the server; and a processor for executing the program code to generate AACS-encrypted data;

wherein the pre-calculated media key is packaged in an installation file of the recording software.

14. The optical media recording device of claim 13, further comprising an optical drive coupled to the processor for writing the AACS-encrypted data to an optical disc.

15. The optical media recording device of claim 14, wherein the optical drive is a Blu-ray optical drive.

16. The optical media recording device of claim 13, further comprising a network interface coupled to the processor for downloading an updated pre-calculated media key from a server, wherein the processor is for replacing the pre-calculated media key with the updated pre-calculated media key.

17. The optical media recording device of claim 13, wherein the media key storage region is located in a registry storage region.

* * * * *